(No Model.)
E. G. FELTHOUSEN.
VALVE.
No. 506,846. Patented Oct. 17, 1893.
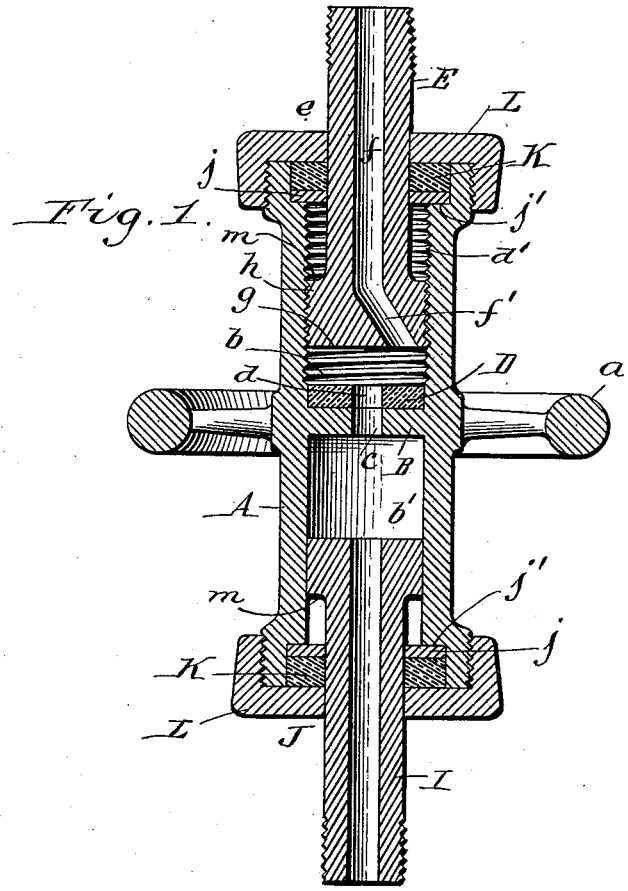
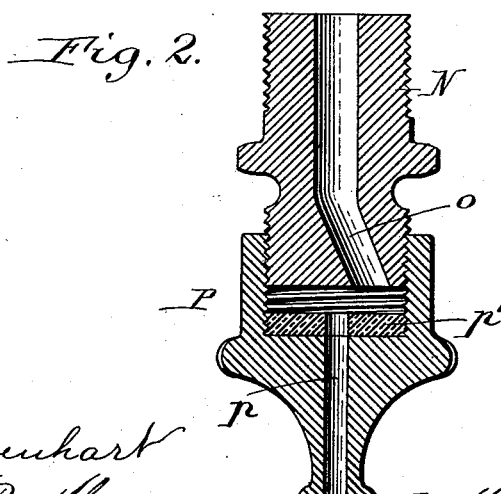
Witnesses:
Emil Neuhart
Chas. F. Burkhardt
E. G. Felthousen
Inventor
By Wilhelm Bonner
Attorneys

UNITED STATES PATENT OFFICE.

EDWARD G. FELTHOUSEN, OF BUFFALO, NEW YORK.

VALVE.

SPECIFICATION forming part of Letters Patent No. 506,846, dated October 17, 1893.

Application filed January 21, 1893. Serial No. 459,122. (No model.)

*To all whom it may concern:*

Be it known that I, EDWARD G. FELTHOUSEN, a citizen of the United States, residing at Buffalo, in the county of Erie and State of New York, have invented new and useful Improvements in Valves, of which the following is a specification.

This invention relates to a hand valve and has the object to produce a valve which is simple in construction and reliable in operation.

In the accompanying drawings: Figure 1 is a longitudinal section of my improved valve showing the same constructed for connecting the ends of two pipe sections. Fig. 2 is a similar section showing a simplified form of my improved valve, suitable for use as a try cock.

Like letters of reference refer to like parts in both figures.

A represents a hollow movable body which is provided with a hand wheel $a$ on its outer side for turning the same on its axis.

B represents a diaphragm formed within the body and which divides the body into an upper or inlet chamber $b$ and a lower or outlet chamber $b'$. The diaphragm is provided with a central opening $c$ which forms a passage connecting the inlet and outlet chambers of the body.

D represents a flat packing ring resting upon the diaphragm and provided with a central opening $d$ coinciding with the passage in the diaphragm.

The inlet chamber is provided with an internal screw thread $d'$ and the outlet chamber is provided with a smooth cylindrical bore.

E represents a stationary inlet nipple which passes through a stuffing box $e$ closing the upper end of the inlet chamber and which is arranged with its lower end in the inlet chamber and adapted to be connected with its upper end to a supply pipe. The upper portion $f$ of the passage in the inlet nipple is arranged centrally in the nipple and its lower portion $f'$ extends obliquely to the lower end of the inlet nipple so that it stands out of line with the central passages in the packing ring and diaphragm. The lower end of the inlet nipple is provided with a flat valve seat $g$ against which the packing ring is adapted to bear. The lower portion of the inlet nipple is provided with an external screw thread $h$ which engages with the internal screw thread of the inlet chamber. Upon turning the body A of the valve in one or the other direction the screw threaded connection between the body and inlet nipple causes the packing ring and diaphragm to be carried toward or from the seat at the lower end of the inlet nipple. In the position of the parts represented in Fig. 1, the face of the packing ring is separated from the seat on the nipple by a space which forms a connecting passage between the passage $f'$ in the nipple and the passages in the valve ring and diaphragm thereby permitting the fluid to flow from the inlet to the outlet chamber. Upon turning the body in the proper direction the packing ring is pressed against the seat on the nipple so that the solid portion of the packing ring closes the passage in the nipple, thereby closing the valve.

I represents a stationary outlet nipple which passes through a stuffing box J closing the lower end of the outlet chamber and which is arranged with its upper end in the outlet chamber and connected with its lower end to the delivery pipe. Upon turning the body it moves lengthwise upon the outlet nipple and the lower stuffing box maintains a tight connection of these parts.

The stuffing boxes closing the inlet and outlet chambers of the body are constructed as follows: $j$ represents rigid supporting rings preferably of metal which rest upon internal ledges or shoulders $j'$ formed in the outer ends of the body. K represents yielding packing rings resting upon the supporting rings. L represents caps which bear against the outer sides of the packing rings and are provided with internal screw threads which engage with external screw threads on the ends of the body. In order to prevent the body from becoming detached from the nipples those portions of the nipples which pass through the stuffing boxes are contracted thereby forming shoulders $m$ on the enlarged opposing ends of the nipples which are adapted to strike the inner sides of the supporting rings and thereby limit the lengthwise movement of the body on the nipples. It is obvious that the valve would operate the same if the fluid were admitted through the outlet nipple and discharged through the inlet nipple.

The valve represented in Fig. 1 is designed for use in a pipe or other conduit in place of an ordinary stop cock. When the valve is designed for a use in which the fluid is simply discharged from a pipe or nipple the construction represented in Fig. 2 is adopted. In this construction N represents a nipple having its bore terminating in a one sided passage $o$ which opens in a flat valve seat and P represents the movable body which is in this case a cap connected with the nipple by a screw thread and provided with a central discharge passage $p$ and a centrally perforated packing $p'$.

I claim as my invention—

1. The combination with a nipple having a flat face, of a body surrounding the nipple and capable of longitudinal movement thereon toward and from said face, said body being provided with a passage which is arranged out of line with the orifice of the nipple and with a perforated packing ring facing said face and surrounding the passage of the body, substantially as set forth.

2. The combination with an inlet nipple and an outlet nipple, of a connecting body capable of longitudinal movement on said nipples, and provided with a perforated diaphragm between said nipples, the perforation in said diaphragm being arranged out of line with the orifice of the nipple against which the diaphragm is closed, substantially as set forth.

3. The combination with an inlet nipple and an outlet nipple, of a connecting body capable of longitudinal movement on said nipples and provided with a perforated diaphragm between said nipples, the perforation in said diaphragm being arranged out of line with the orifice of the nipple against which the diaphragm is closed, and with stuffing boxes surrounding said nipples, substantially as set forth.

4. The combination with an inlet nipple and an outlet nipple provided with enlarged opposing ends, of a connecting body capable of longitudinal movement on said nipples and provided with a perforated diaphragm between said nipples, the perforation in said diaphragm being arranged out of line with the orifice of the nipple against which the diaphragm is closed, and at its ends with stuffing boxes which embrace the nipple outside of their enlarged ends, substantially as set forth.

Witness my hand this 16th day of January, 1893.

EDWARD G. FELTHOUSEN.

Witnesses:
JNO. J. BONNER,
FRED. C. GEYER.